United States Patent
Keoshkerian et al.

(10) Patent No.: US 10,315,409 B2
(45) Date of Patent: Jun. 11, 2019

(54) METHOD OF SELECTIVE LASER SINTERING

(71) Applicant: XEROX CORPORATION, Norwalk, CT (US)

(72) Inventors: Barkev Keoshkerian, Thornhill (CA); Jordan H. Wosnick, Toronto (CA); Rachel Prestayko, Hamilton (CA); Kimberly D. Nosella, Mississauga (CA); Valerie M. Farrugia, Oakville (CA); Edward G. Zwartz, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 136 days.

(21) Appl. No.: 15/215,285

(22) Filed: Jul. 20, 2016

(65) Prior Publication Data
US 2018/0022043 A1 Jan. 25, 2018

(51) Int. Cl.
| | |
|---|---|
| *B29C 67/00* | (2017.01) |
| *B33Y 10/00* | (2015.01) |
| *B33Y 30/00* | (2015.01) |
| *B33Y 70/00* | (2015.01) |
| *B29C 64/135* | (2017.01) |
| *B29C 64/153* | (2017.01) |
| *B29K 21/00* | (2006.01) |
| *B29K 67/00* | (2006.01) |
| *B29K 105/00* | (2006.01) |

(52) U.S. Cl.
CPC ............ *B33Y 70/00* (2014.12); *B29C 64/135* (2017.08); *B29C 64/153* (2017.08); *B33Y 10/00* (2014.12); *B29K 2021/003* (2013.01); *B29K 2067/00* (2013.01); *B29K 2105/251* (2013.01)

(58) Field of Classification Search
CPC .................................................. B29C 64/153
See application file for complete search history.

(56) References Cited

U.S. PATENT DOCUMENTS

| | | |
|---|---|---|
| 3,590,000 A | 6/1971 | Palermiti et al. |
| 3,655,374 A | 4/1972 | Palermiti et al. |
| 3,720,617 A | 3/1973 | Chatterji et al. |
| 3,983,045 A | 9/1976 | Jugle et al. |

(Continued)

FOREIGN PATENT DOCUMENTS

| | | |
|---|---|---|
| JP | 2014188871 A | 10/2014 |
| WO | WO2014144230 A1 | 9/2014 |
| WO | WO2016057250 A1 | 4/2016 |

OTHER PUBLICATIONS

Stephanie Fanselow, Jochen Schmidt, Karl-Ernst Wirth, and Wolfgang Peukert, "Production of micron-sized polymer particles for additive manufacturing by melt emulsification", AIP Conference Proceedings 1713, 140007 (2016).*

(Continued)

*Primary Examiner* — Jason L Lazorcik
(74) *Attorney, Agent, or Firm* — MH2 Technology Law Group LLP (57) ABSTRACT

A method of selective laser sintering is disclosed. The method comprises providing composite particles made by emulsion aggregation, the composite particles comprising at least one thermoplastic polymer and at least one carbon particle material. The composite particles are exposed to a laser to fuse the composite particles.

20 Claims, 3 Drawing Sheets

(56) References Cited

U.S. PATENT DOCUMENTS

| | | |
|---|---|---|
| 4,265,660 A | 5/1981 | Giflo |
| 4,935,326 A | 6/1990 | Creatura et al. |
| 4,937,166 A | 6/1990 | Creatura et al. |
| 5,278,020 A | 1/1994 | Grushkin et al. |
| 5,290,654 A | 3/1994 | Sacripante et al. |
| 5,308,734 A | 5/1994 | Sacripante et al. |
| 5,344,738 A | 9/1994 | Kmiecik-Lawrynowicz et al. |
| 5,346,797 A | 9/1994 | Kmiecik-Lawrynowicz et al. |
| 5,348,832 A | 9/1994 | Sacripante et al. |
| 5,364,729 A | 11/1994 | Kmiecik-Lawrynowicz et al. |
| 5,366,841 A | 11/1994 | Patel et al. |
| 5,370,963 A | 12/1994 | Patel et al. |
| 5,403,693 A | 4/1995 | Patel et al. |
| 5,405,728 A | 4/1995 | Hopper et al. |
| 5,418,108 A | 5/1995 | Kmiecik-Lawrynowicz et al. |
| 5,496,676 A | 3/1996 | Croucher et al. |
| 5,501,935 A | 3/1996 | Patel et al. |
| 5,527,658 A | 6/1996 | Hopper et al. |
| 5,585,215 A | 12/1996 | Ong et al. |
| 5,593,807 A | 1/1997 | Sacripante et al. |
| 5,650,255 A | 7/1997 | Ng et al. |
| 5,650,256 A | 7/1997 | Veregin et al. |
| 5,686,218 A | 11/1997 | Liebermann et al. |
| 5,723,253 A | 3/1998 | Higashino et al. |
| 5,744,520 A | 4/1998 | Kmiecik-Lawrynowicz et al. |
| 5,747,215 A | 5/1998 | Ong et al. |
| 5,763,133 A | 6/1998 | Ong et al. |
| 5,766,818 A | 6/1998 | Smith et al. |
| 5,804,349 A | 9/1998 | Ong et al. |
| 5,817,206 A * | 10/1998 | McAlea ............... C08J 3/122 156/272.8 |
| 5,827,633 A | 10/1998 | Ong et al. |
| 5,840,462 A | 11/1998 | Foucher et al. |
| 5,853,944 A | 12/1998 | Foucher et al. |
| 5,863,698 A | 1/1999 | Patel et al. |
| 5,869,215 A | 2/1999 | Ong et al. |
| 5,902,710 A | 5/1999 | Ong et al. |
| 5,910,387 A | 6/1999 | Mychajlowskij et al. |
| 5,916,725 A | 6/1999 | Patel et al. |
| 5,919,595 A | 7/1999 | Mychajlowskij et al. |
| 5,925,488 A | 7/1999 | Patel et al. |
| 5,977,210 A | 11/1999 | Patel et al. |
| 5,994,020 A | 11/1999 | Patel et al. |
| 6,020,101 A | 2/2000 | Sacripante et al. |
| 6,110,411 A * | 8/2000 | Clausen ............... B29C 41/003 156/272.8 |
| 6,120,967 A | 9/2000 | Hopper et al. |
| 6,130,021 A | 10/2000 | Patel et al. |
| 6,628,102 B2 | 9/2003 | Batson |
| 6,664,015 B1 | 12/2003 | Sacripante et al. |
| 6,780,560 B2 | 8/2004 | Farrugia et al. |
| 6,818,723 B2 | 11/2004 | Sacripante |
| 6,826,944 B1 | 12/2004 | Hagel |
| 6,830,860 B2 | 12/2004 | Sacripante et al. |
| 6,849,371 B2 | 2/2005 | Sacripante et al. |
| 7,208,253 B2 | 4/2007 | Mayer et al. |
| 7,329,476 B2 | 2/2008 | Sacripante et al. |
| 7,402,371 B2 | 7/2008 | Sacripante et al. |
| 7,416,827 B2 | 8/2008 | Farrugia et al. |
| 7,425,398 B2 | 9/2008 | Nosella et al. |
| 7,442,740 B2 | 10/2008 | Patel et al. |
| 8,076,048 B2 | 12/2011 | Sacripante |
| 8,187,521 B2 * | 5/2012 | Larsson ............... B22F 3/1055 264/485 |
| 9,205,604 B2 * | 12/2015 | Farmer .................. C08J 3/126 |
| 9,821,411 B2 * | 11/2017 | Buller .................. B23K 26/346 |
| 2002/0081509 A1 | 6/2002 | Yoshida et al. |
| 2004/0209989 A1 * | 10/2004 | Cevolini ............... B33Y 70/00 524/492 |
| 2006/0134419 A1 * | 6/2006 | Monsheimer .......... C08G 65/40 428/402 |
| 2006/0202395 A1 * | 9/2006 | Monsheimer .......... C08G 69/14 264/497 |
| 2006/0269859 A1 | 11/2006 | Skorokhod et al. |
| 2007/0190440 A1 | 8/2007 | Kanamaru et al. |
| 2007/0290410 A1 * | 12/2007 | Koo ..................... B29C 64/153 264/497 |
| 2008/0107989 A1 | 5/2008 | Sacripante et al. |
| 2008/0236446 A1 | 10/2008 | Zhou et al. |
| 2009/0189125 A1 | 7/2009 | Grigorian et al. |
| 2010/0124713 A1 * | 5/2010 | Farrugia .............. G03G 9/0902 430/108.1 |
| 2010/0143668 A1 * | 6/2010 | Farmer .................... B29B 9/14 428/195.1 |
| 2010/0267902 A1 * | 10/2010 | Cai .......................... C08J 3/205 525/331.5 |
| 2014/0138589 A1 | 5/2014 | Hayano et al. |
| 2017/0028632 A1 * | 2/2017 | Cox .................... B29C 67/0077 |
| 2018/0009033 A1 * | 1/2018 | Fager ..................... B29C 64/153 |

OTHER PUBLICATIONS

Extended European Search Report dated Nov. 22, 2017 from corresponding European Applicatiion No. 17181760.4.

Extended European Search Report dated Dec. 20, 2017 in related European Patent Application No. 17181759.6.

Wei et al., "3D Printable Graphene Composite," Scientific Reports, vol. 5, No. 1, Jul. 8, 2015, pp. 1-7.

Tung, "Melt Viscosity of Polyethylene at Zero Shear," Journal of Polymer Science, vol. XLVI, 1960.

Author Unknown, "PCL Applications and End Uses Polythene," Polyesterconverters.com, retrieved on May 23, 2018.

Canadian Office Action issued in corresponding Canadian Application No. 2,974,094 dated Sep. 17, 2018 (5 pages).

Canadian Office Action issued in related corresponding Canadian Application No. 2,974,293 dated Sep. 17, 2018 (5 pages).

* cited by examiner

METHOD OF SELECTIVE LASER SINTERING

DETAILED DESCRIPTION

Field of the Disclosure

The present disclosure is directed to a method of selective laser sintering, and in particular, to a method of selective laser sintering of composite particles made by emulsion aggregation.

Background

Additive manufacturing (also known as three dimensional printing) as practiced in industry has been, to date, mostly concerned with printing structural features. The main materials used are thermoplastics that offer form but not function. There is great interest in the field to develop improved materials that can be used to easily print completely integrated functional objects with limited post-assembly. This would allow completely new designs in the manufacturing and consumption of everyday objects, particularly when they can be enabled with conductive materials. The capability of printing conductive components within an object can provide the potential for embedded sensors and electronics.

One common additive manufacturing technique is known as selective laser sintering (SLS). In selective laser sintering (SLS) a rasterized laser is used to "scan" over a bed of polymer powder, sintering it to form solid shapes in a layer-wise fashion.

Functionality to 3D objects can potentially be imparted by including one or more additional components to the polymer powders used in SLS printing. However, incorporating these components for 3D printing has been a challenge. The material used for SLS is typically powdered nylon (polyamide) with particle sizes ranging from about 100 to about 300 microns. The polymer particulates can be used either alone or in composite form (with additives such as glass particles, carbon fiber, etc.). Where composites are used, the additives are not intimately mixed with the polymer, which affects the final properties of the 3D object. Furthermore sufficiently high loadings of composites for increased conductivity are difficult to simply mix in.

Achieving high loadings of conductive materials (e.g., graphitic materials) into a filament composite can potentially enable high conductivity. However, such high loadings for typical additive manufacturing polymers (e.g. polyamide, polycaprolactone, polyurethanes) can result in relatively high melt temperatures of, for example, over 250° C. or 300° C. This increases the sinter temperatures employed in SLS and may render the materials unsuitable for printing if such high temperatures are not achievable in the 3D printer being used. In addition, even if the melt temperatures are attainable, polymer degradation becomes an issue at such high temperatures.

The process of emulsion aggregation (EA) is generally well known, such as for toner manufacturing. In a typical EA process, a latex is first aggregated by the judicious use of an aggregant that destabilizes the latex and allows controlled growth to a desired particle size. It is then stabilized and heated above the glass transition temperature ("Tg") of the polymer to allow for polymer flow and a homogenous polymer particle. In manufacturing toner, different materials (pigments, carbon particles, for example carbon black, or waxes) are added during the EA process that can be incorporated in the final polymer particle. However graphitic materials such as Carbon Nanotubes (CNT) have not been used in the percentages (e.g., >5% by weight) required to enable conductive polymers (with conductivities typically greater than 1 S/cm).

A novel process that would allow broader polymer classes, higher composite compositions and better dispersed additives would be extremely useful to prepare composite materials for the next generation of functionalized 3D objects.

SUMMARY

An embodiment of the present disclosure is directed to a method of selective laser sintering. The method comprises providing composite particles made by emulsion aggregation, the composite particles comprising at least one thermoplastic polymer and at least one carbon particle material. The composite particles are exposed to a laser to fuse the composite particles.

Another embodiment of the present disclosure is directed to a method of selective laser sintering. The method comprises providing composite particles made by emulsion aggregation. The composite particles comprise at least one thermoplastic polymer and at least one carbon particle material, the carbon particle material being in an amount of at least 5% by weight based on the total weight of the composite particles, the at least one carbon particle material selected from the group consisting of carbon nanotubes, graphite, graphene and combinations thereof. The composite particles are exposed to a laser to fuse the composite particles to form a three-dimensional object by selective laser sintering.

Another embodiment of the present disclosure is directed to a method of selective laser sintering. The method comprises making composite particles by an emulsion aggregation process. The composite particles comprise at least one thermoplastic polymer and at least one carbon particle material. The composite particles are exposed to a laser to fuse the composite particles to form a three-dimensional object by selective laser sintering.

The compositions of the present application exhibit one or more of the following advantages: the ability to use a broader range of polymers, including polymers with low Tg and/or low viscosities to form materials with improved processability for 3D printing applications, such as use in fused deposition modeling (FDM) filaments and pastes; the ability to form particles of virtually any size, including nanoparticle and microparticle sizes; the ability to form particles that are more monodisperse than many other processes; the ability to uniformly incorporate composite additives into the polymer particles themselves so as to form composite particles; an unexpected, synergistic increase in electrical conductivity when emulsion aggregation is used to form polymer/conductive particle composites compared to conductivities achieved using melt mixing alone to achieve mixing of the polymer and conductive particle; or an improved method for increasing the electrical conductivity in polymer composites while retaining material properties suitable for additive manufacturing.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawings that form a part thereof, and in which is shown by way of illustration a specific exemplary embodiment in which the present teachings may be practiced. The following description is, therefore, merely exemplary.

The present application is directed to a method of selective laser sintering. The method comprises providing composite particles made by an emulsion aggregation process. The composite particles comprise at least one thermoplastic polymer and at least one carbon particle material, both incorporated into the composite particles; and exposing the composite particles to a laser to fuse the particles.

The at least one polymer can be any thermoplastic material useful in selective laser printing that is capable of forming a latex emulsion, where the size of the latex particles can be grown by emulsion aggregation. A single latex polymer or mixtures of thermoplastic latex polymers can be employed, including mixtures of any of the thermoplastic latex polymers disclosed herein. Polymers can be selected based on desired properties of the composite, including glass-transition temperature, mechanical strength or molecular weight properties that are suitable for a particular application. In an embodiment, the thermoplastic latex polymer comprises at least one repeating unit selected from the group consisting of acrylate units, alkyl acrylate units such as butyl acrylate (e.g., n-butyl acrylate), carboxylic acid ester units, amide units, lactic acid units, benzimidazole units, carbonate ester units, ether units, sulfone units, arylketone units, arylether units, etherimide units, ethylene units, phenylene oxide units, propylene units, styrene units, vinyl halide units and carbamate units. In an embodiment, the thermoplastic polymer is a copolymer, such as a block copolymer, of two or more of any of the above listed repeating units. As an example, the thermoplastic polymer latex can comprise at least one polymer selected from the group consisting of polyacrylates, polybenzimidazoles, polycarbonates, polyether sulfones, polyaryl ether ketones such as polyether ether ketone, polyetherimide, polyethylenes such as polyethylene and poly(ethylene-co-vinylacetate), polyphenylene oxides, polypropylenes such as polypropylene and Poly(vinylidene fluoride-co-hexafluoropropylene), polystyrenes such as polystyrene, poly(styrene isoprene styrene), acrylonitrile butadiene styrene (ABS) and poly(Styrene Ethylene Butylene Styrene) (SEBS), styrene-butyl acrylates such as styrene n-butyl acrylate, polyesters such as polyethylene terephthalate, polylactic acid (PLA) and polycaprolactone, polyurethanes, polyamides such as nylon, Poly(vinylidene fluoride) (PVDF) and polyvinyl chlorides. If desired, the particles can comprise bio-based (sustainable) polymers derived from renewable sources. In an embodiment, the thermoplastic polymer does not include Acrylonitrile butadiene styrene (ABS) or PLA.

In an embodiment, low viscosity and/or low glass transition polymers are employed. It is believed that the use of low viscosity polymers can allow for high CNT loadings, thereby increasing conductivity, while achieving final polymer melt properties for the composite that are relatively low (e.g., composite melt temperature in the region of about 250° C. or lower). The low viscosity and/or low Tg polymers are chosen to have viscosities lower than 100,000 centipoise, such as a viscosity ranging from about 100 to about 50,000 centipoise and preferably 1,000 to about 10,000 centipoise, where viscosity is determined at a shear of 6.28 rad/sec using a TA instruments model DHR2 rheometer with 2 parallel (25 mm) plates at a temperature of 100° C. The polymers can also be chosen to have Tg of less than 20° C., such as a Tg ranging from about −50° C. to about 20° C. and preferably from about −30° C. to about 0° C.

Examples of such low viscosity polymers include latex comprising poly n-butylacrylate or copolymers with styrene, such as styrene-butyl acrylate latex. Another example of a low viscosity polymer is polyester latex, such as poly(propoxylated bisphenol A co-fumarate).

The thermoplastic polymer can be included in the composite particles in any suitable amount that will allow the composite particles to function in a three dimensional, SLS printing process. Examples of suitable amounts include a range of from about 40% to about 95% by weight, such as about 60% to about 95%, or about 80% to about 95% by weight, relative to the total weight of the conductive polymer composite.

Any suitable carbon particle material can be employed in the composites of the present disclosure. The carbon particle material can be selected from graphitic particles, such as graphene particles and graphite particles, carbon nanotubes and mixtures of graphitic particles and carbon nanotubes. The term "graphitic particles" is defined herein to include both graphene particles and graphite particles. Carbon particles other than graphitic materials can potentially be used, such as, for example, carbon black. In an embodiment, carbon black is not employed as a carbon particle, and may be excluded from the composite particles of the present disclosure.

Any suitable carbon nanotubes can be employed. Examples of suitable carbon nanotubes include single walled carbon nanotubes, multi-walled carbon nanotubes and mixtures thereof. In an embodiment, the carbon nanotubes are multi-walled carbon nanotubes. Commercially available sources of carbon nanotubes include, for example, carbon nanotubes available from CHEAPTUBES™ or NANOCYL™, such as Nanocyl 7000.

The composite can include carbon nanotubes and/or graphitic particles in any suitable amount that will provide the desired conductivity. In an embodiment, the total amount of carbon particles (CNT plus graphitic material) in the composite particles is in an amount of at least 5% by weight, such as 5% to about 70%, or 10% to about 50%, or about 15% to about 40%, or about 25% to about 40% by weight, based on the total weight of the conductive polymer composite particles. Example amounts of carbon nanotubes include a range of from 1% to about 40% by weight, such as about 2% to about 20% or about 5% to about 15%, relative to the total weight of the conductive polymer composite particles. Larger amounts of carbon nanotubes may reduce processability of the composition by a 3D printer, depending, on among other things, the type of thermoplastic and the printing process employed. Thus, in an embodiment, carbon nanotube concentrations of 20% by weight or less, such as 10% by weight or less, relative to the total weight of the conductive polymer composite particles may be preferred. Example amounts of graphitic particles include a range of from about 1% to about 50% by weight, or about 2% to about 40% by weight, or about 3% to about 40% by weight, or about 5% to about 40% by weight, or about 10% to about 40% by weight, or about 20% to about 35% by weight, relative to the total weight of the conductive polymer composite particles.

The average size of the graphitic particle materials can be any desired size. As an example, the size of the graphitic particle materials can range from about 10 nm to about 10 micron, such as about 15 nm to about 5 microns or about 20 nm to about 1 micron or about 50 nm to about 500 nm or about 50 nm to about 300 nm. For graphite and carbon nanotubes, "size" refers to the smallest dimension of the particle, such as diameter. For graphene, the "size" refers to the smallest dimension other than the thickness, which for graphene may be a single monolayer of carbon.

In an embodiment, the emulsion aggregation process comprises: providing a stable emulsion of latex polymer particles. For example, any of the latex polymers described herein can be employed. The stable latex emulsion can be obtained from a third party supplier, or can be made as part of the overall process. For example, the emulsion of latex polymer particles can be made by providing at least one suitable monomer material; and then preparing the emulsion of latex polymer particles from the monomer material by any suitable polymerization technique. Suitable monomers and techniques for forming latex polymers from the monomers are generally well known in the art.

The latex emulsion is mixed with a plurality of carbon particles, including one or more of carbon nanotubes, graphite particles or graphene particles, as described herein. Optionally, the carbon particles can be pre-mixed with a liquid carrier to form a dispersion prior to mixing with the latex emulsion. Other optional ingredients, such as dispersants or pH modifying agents for stabilizing the carbon particle dispersion can also be included, either as an additive to the carbon particle dispersion prior to mixing with the latex emulsion, or as an optional additive that is added after mixing the latex emulsion and carbon particle dispersion. In an embodiment, the carbon particles can be well mixed with the latex emulsion to provide a uniform dispersion of the carbon particles in the latex emulsion.

The mixture of the latex emulsion and carbon particles are then aggregated by the judicious use of an aggregant that destabilizes the latex and allows controlled growth to a desired particle size. Because the latex polymer particles are aggregated in the presence of the at least one carbon particle material, aggregate particles comprising both the latex polymer particles and the conductive carbon material are formed. Examples of suitable aggregants for use in the process include cationic surfactants, for example, dialkyl benzenealkyl ammonium chloride, lauryl trimethyl ammonium chloride, alkylbenzyl methyl ammonium chloride, halide salts of quaternized polyoxyethylalkylamines, dodecylbenzyl triethyl ammonium chloride, MIRAPOLT™ and ALKAQUAT™ available from Alkaril Chemical Company, SANIZOL™, available from Kao Chemicals, and the like and mixtures thereof. An effective concentration of the cationic surfactant generally employed is, for example, from about 0.01 to about 10 percent by weight and preferably from about 0.1 to about 5 percent by weight of monomers used to prepare the copolymer resin. After the composite particles reach the desired size through aggregation, the emulsion is then stabilized so as to freeze particle growth. This can be accomplished by any suitable method, such as by adjusting pH (e.g., to greater than 8) to accomplish a charge on the particle surface.

The aggregate particles are then heated above the Tg of the polymer so as to flow the polymer sufficiently to coalesce the latex polymer particles. The resulting composite particles comprise the coalesced latex polymer with the conductive carbon particles material mixed therein. In an embodiment, the carbon particles are uniformly dispersed in the coalesced latex polymer of the composite particles so that intimate mixing of the polymer and conductive carbon particles on a micron scale or nanometer scale can be achieved. Examples of suitable temperatures used for coalescing the composite particles can range from about 45° C. to about 95° C., such as about 55° C. to about 75° C.

The composite particles can then optionally be washed and dried using any desired process. Suitable processes for washing and/or drying the particles are well known in the art. In addition to SLS, the particles can be employed in other additive manufacturing techniques, such as described in co-pending U.S. patent application Ser. No. 15/215,226, filed Jul. 20, 2016, the disclosure of which is incorporated herein by reference in its entirety.

The composite particles of the present disclosure can include any suitable optional ingredients other than latex polymer and carbon particles in any desired amounts. For example, the composite particles can optionally include plasticizers, waxes, dyes, pigments, ceramic particles and other fillers. These additives can be included prior to or during aggregation of the latex, as described above, so that during aggregation the additives are uniformly incorporated into the aggregate particles. Alternatively, ingredients not expressly recited in the present disclosure can be limited and/or excluded from the conductive polymer composite particles disclosed herein. Thus, the amounts of the thermoplastic polymer and carbon particles, with or without any optional ingredients as recited herein such plasticizers, waxes, dyes, pigments, ceramic particles (e.g., ceramic nanoparticles) and other fillers, can add up to 90% to 100% by weight of the total ingredients employed in the composite particles of the present disclosure, such as 95% to 100% by weight, or 98% to 100% by weight, or 99% to 100% by weight, or 100% by weight of the total ingredients.

The composite particles can be used as is in a dry form for SLS processes. The particles can be dry-blended with any desired optional external additives, such as pigments, ceramic particles (e.g., ceramic nanoparticles), waxes and so forth. Alternatively, the composite particles and any optional external additives can be used to make a paste feed material. In an embodiment, a diluent is added to the composite particles to form the paste. The amount of diluent can be chosen to provide a desired viscosity that is suitable for paste extrusion processing. Example viscosities for the paste can range from about 10 to about 20,000 centipoise, such as about 100 to about 1,000 centipoise, where viscosity is determined at a shear of 6.28 rad/sec using a TA instruments model DHR2 rheometer with 2 parallel (25 mm) plates at a temperature of 100° C. Diluents can be organic solvents such as alkanes, alcohols or aromatic solvents. The concentration of solids in the paste can be, for example, from about 20% to about 60% solids content (w/w), where a portion or all of the solids can be the composite particles of the present disclosure.

The composite particles can have one or more physical differences from particles made by other methods. For example, the particles can have a relatively smooth, spherical shape compared to particles made by grinding techniques. In an embodiment, composite particles formed by emulsion aggregation processes of the present disclosure are relatively monodisperse (e.g., the particles have a smaller size distribution without filtering) compared to particles made by other methods, such as grinding. Further, one of ordinary skill in the art would be able to determine that the present particles are not made by grinding techniques by visual inspection, such as with a high power microscope.

The composite particles made by the emulsion aggregation processes of the present disclosure can have any desired size. Examples of suitable sizes include an average size of about 500 nm to about 100 microns, or about 1 micron to about 50 microns. In an embodiment, the composite particles have a typical toner size, such as about 5 microns to about 20 microns. In practice, the use of smaller particles, such as toner-sized particles, may be advantageous in SLS relative to currently used particle size ranges due to the fine-grained nature of the shapes thus available. In an embodiment, the composite particle can be a toner made by emulsion aggregation processing.

In an embodiment, the present disclosure is directed to a method of selective laser sintering. The method comprises making composite particles comprising at least one thermoplastic polymer and at least one carbon particle material incorporated into the composite particles; and exposing the composite particles to a laser to fuse the particles to form a three-dimensional object by selective laser sintering.

Figure 1:
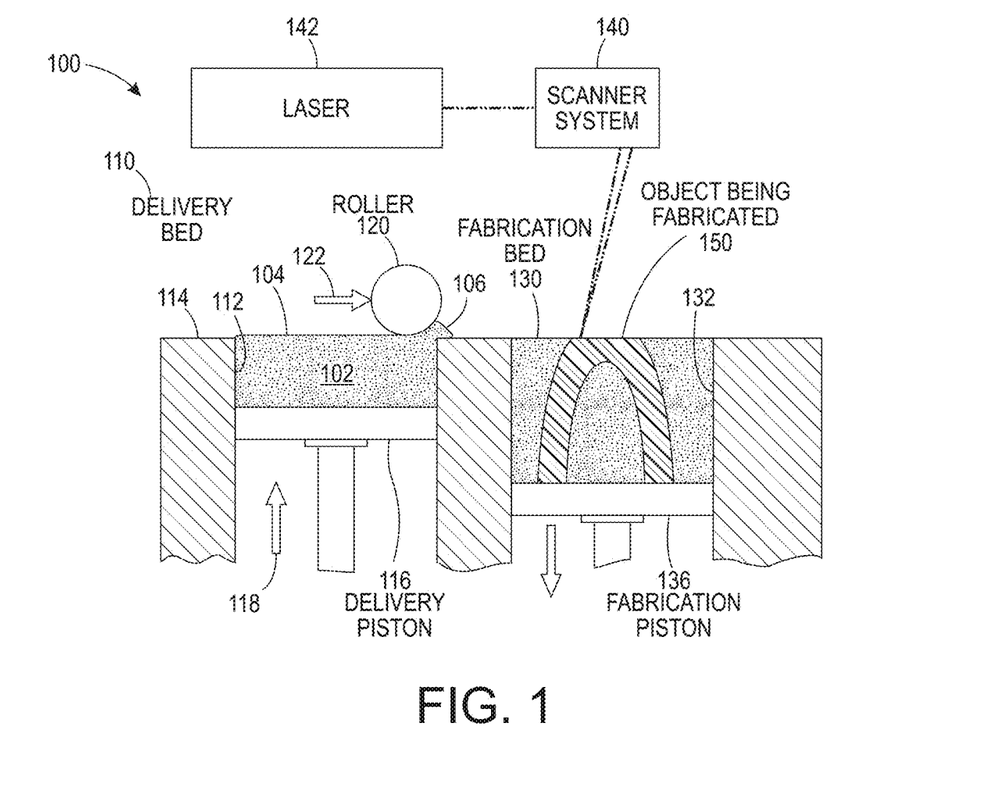
FIG. 1 illustrates a three-dimensional SLS printer employing composite particles of the present disclosure.

FIG. 1 depicts an illustrative 3D printer 100 for printing 3D objects, according to one or more embodiments disclosed. The printer 100 may include a delivery bed 110 defined by one or more sidewalls 112 and a delivery piston 116. The composite particles 102 may be loaded into the delivery bed 110 in dry powder and/or paste form. Once loaded, the upper surface 104 of the composite particles 102 may be even with or below the upper surface 114 of the sidewall 112. The delivery piston 116 may then move upwards in the direction of arrow 118 until the upper surface 104 of the composite particles 102 is even with or above the upper surface 114 of the sidewall 112.

A transfer member (e.g., a roller) 120 may then transfer a portion 106 of the composite particles 102 above the upper surface 114 of the sidewall 112 from the delivery bed 110 into a fabrication bed 130 (e.g., in the direction of the arrow 122). The fabrication bed 130 may be defined by one or more sidewalls 132 and a fabrication piston 136. The transferred portion 106 of the composite particles 102 may form a first layer in the fabrication bed 130 that has a thickness from about 10 μm to about 50 μm, about 50 μm to about 100 μm, about 100 μm to about 250 μm, or any other suitable thickness.

A scanning system 140 may scan the composite particles 102 in the first layer, and a laser 142 may then sinter the first layer in response to the scan results. The laser 142 may be a continuous wave laser or a pulse laser. When the laser 142 is a pulse laser, the pulse length and intervals may be adjusted for proper sintering. For example, when the composite particles 102 in the form of a paste are used in the printing process, the pulses may have a relatively long interval (e.g., from about 100 ms to about 5 s) to allow time for the diluent to at least partially evaporate. The sintering may take place at a temperature less than or equal to about 200° C., a temperature less than or equal to about 150° C., less than or equal to about 125° C., or less than or equal to about 100° C.

Once the first layer has been sintered in the fabrication bed 130 the delivery piston 116 may then move upwards again in the direction of the arrow 118 until the upper surface 104 of the composite particles 102 is again even with or above the upper surface 114 of the sidewall 112 of the delivery bed 110. The fabrication piston 136 may move downwards. The transfer member 120 may then transfer another portion of the composite particles 102 that are above the upper surface 114 of the sidewall 112 from the delivery bed 110 into the fabrication bed 130 to form a second layer that is on and/or over the first layer. The laser 142 may then sinter the second layer. This process may be repeated until the desired 3D object is produced.

The three dimensional printer 100 as shown in FIG. 1 is exemplary only and any type of SLS printer can be employed.

In an embodiment, the three-dimensional objects made from the composite particles can be conductive (e.g., have a bulk conductivity that is greater than 0.01 S/cm, such as greater than 1 S/cm, as measured by a voltmeter).

EXAMPLES

Example 1—EA Process for Composite Particles—Pre-Dispersion of Carbon Nanotubes (CNT)

Nanocyl-NC7000 with 14.1 pph Dowfax 2A1. In a 1 L plastic bottle 9.7 g of Nanocyl-NC7000 (carbon nanotubes made by Nanocyl of Sambreville, Belgium) and a magnetic stir bar was added. In a 500 ml beaker, 1.35 g of anionic surfactant (Dowfax 2A1) and 230 g of DI water were mixed and heated on a mixing hotplate to 65° C. Once heated, the DI water and surfactant were added to the 1 L bottle. The 1 L bottle was then placed in a water bath at 65° C. and left mixing overnight.

Example 2—10 wt. % CNT/Toner Preparation Using EA Toner (Polyester Based)

In a 2 L glass kettle, 221 g of amorphous polyester emulsion (bis phenol type polyester), 241 g of the pre-dispersion of Example 1 and 330 g DI water were combined using homogenization at 3,000 rpm. The slurry was pH adjusted to 4.5 using 0.3M nitric acid. Then 1.7 g of aluminum sulphate mixed with 21 g DI water was added to the slurry under homogenization at 3000-6000 RPM. The reactor was set to 260 RPM and was heated to 49° C. to aggregate the composite particles. The reactor temperature was further increased to 55° C. When the composite particle size reached 7-8 microns, freezing of particle growth began with the pH of the slurry being adjusted to 7.8 using a 4% NaOH solution. The reactor RPM was decreased to 200 and the reactor temperature was ramped to 85° C. The pH of the slurry was maintained at 7.8 or greater until 73.5° C. Once at the coalescence temperature, the composite particles were coalesced for 1 hour, then quench cooled in 360 g DI ice. The composite particles were then washed with 3 DI water washes using 6:1 parts water to dry toner and freeze-dried.

Example 3—10 wt. % CNT/Toner Preparation Using EA Toner (Styrene/nBA Based)

In a 2 L glass kettle fitted with a cooling jacket of isopropyl alcohol ("IPA") and ice, the following ingredients were combined: 150 g of styrene-butyl acrylate latex (75 weight % styrene/25 weight percent butyl acrylate, $M_w$ of ~50,000), 59 g of a styrene-n-butyl acrylate latex (10 weight % styrene/90 weight % n-butyl acrylate, $M_w$~200,000), 65 g of the pre-dispersion of Example 1 and 362 g DI water. Once slurry temperature was less than or equal to 3° C.; 1.7 g of aluminum sulphate mixed with 21 g DI water was added to the slurry under homogenization at 3000-4000 RPM. The reactor was set to 200 RPM and was slowly step heated to 10° C. to aggregate the composite particles. The reactor temperature was further increased to 48° C. and monitored using a microscope. The reactor temperature was further heated to 75° C. where upon looking under the microscope the composite particles had coalesced. The composite particles were then quench cooled in 370 g DI ice. The composite particles were then filtered once and air dried in the fumehood. No rejection of composite particles was observed during the process (e.g., particles continued to grow during aggregation without rejecting smaller particles).

Example 4—25 wt. % CNT/Toner Preparation Using EA Toner (Polyester Based)

A CNT/Toner preparation was made using the same procedure as in Example 2 above, except that 25 wt. % CNT was employed.

Example 5—SLS Using Functionalized Toners

Figure 2:
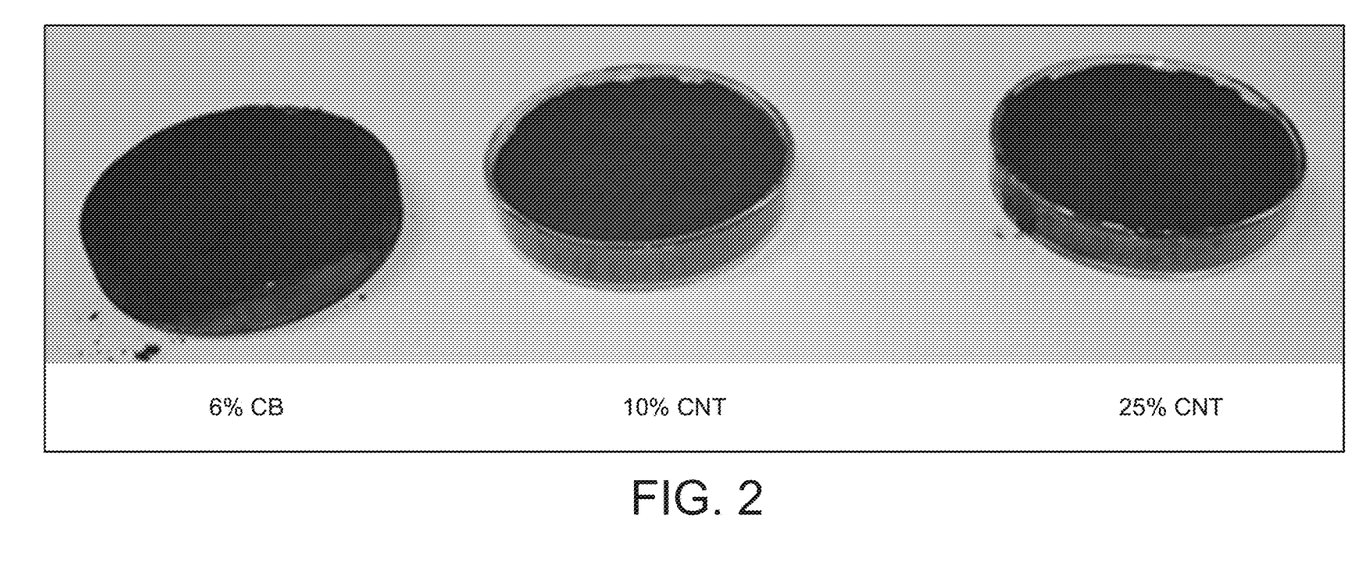
FIG. 2 shows toner particles and particles made via the EA process compacted in a crystallization dish, according to an example of the present disclosure.
Figure 3A:
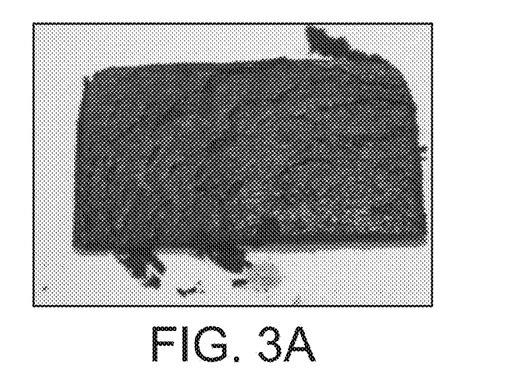
FIG. 3A shows a part formed from sintered particles, according to an example of the present disclosure.
Figure 3B:
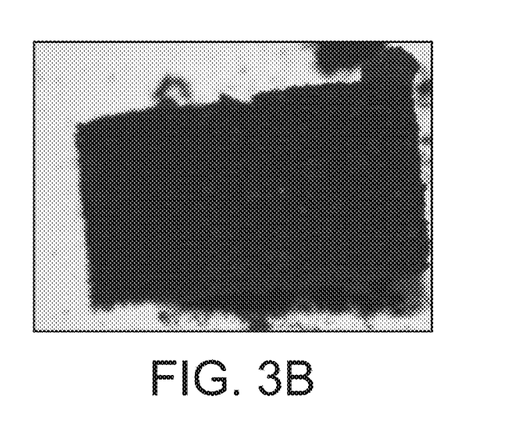
FIG. 3B shows a part formed from sintered particles, according to an example of the present disclosure.
Figure 3C:
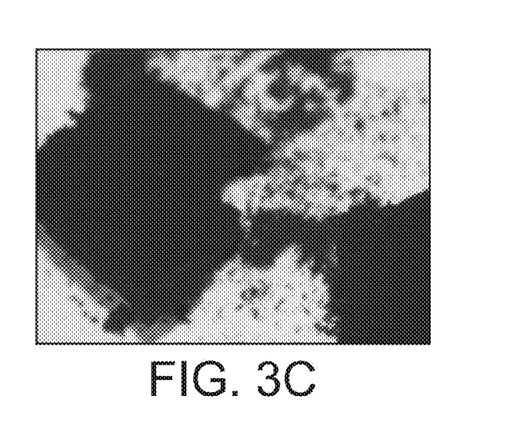
FIG. 3C shows a part formed from sintered particles, according to an example of the present disclosure.

Toner Particles (Pinot, containing 6% carbon black) and particles made via the EA process of Examples 2 and 4 using carbon nanotubes (CNT) were compacted in a crystallization dish (FIG. 2) and then a rectangle of each of the compacted materials was exposed to a laser (Epilog Zing 40 watt $CO^2$ laser at 10% power). The unfused powder was then blown off to give a fused 3D object. As shown in FIG. 3A, the lasered Pinot toner provided a rectangular part that was fused, solid and thinner in diameter than the unfused powder. As shown in FIG. 3B, the lasered particles of Example 2 provided a rectangular solid that was fragile, but held together and had a Matte surface. That the part held together and was thinner than the unfused powder indicated that at least partial fusing had occurred, since fused material is more dense than the free powder. The fused part was still many mm thick and exhibited less "flame". While additional experiments to determine optimal fusing temperatures were not carried out, it is expected that higher fusing temperatures would result in a more complete fusing of the powder. The lasered particles of Example 4 were not solid as shown in FIG. 3C, although the particles were lightly coalesced.

The fusing conditions could be further optimized to ensure that by increasing the materials conductivity the sintering process is not compromised (oxygen free environment to prevent material from catching fire). However, the results are sufficient to show that EA particles and functionalized EA particles can be sintered.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. All concentrations, amounts and ratios herein are disclosed on a by weight basis, unless otherwise made clear by the text of the application.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description or the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A method of selective laser sintering, the method comprising:
providing composite particles made by emulsion aggregation, the composite particles comprising at least one thermoplastic polymer and at least one carbon particle material uniformly dispersed in the composite particle, the at least one thermoplastic polymer having a low viscosity ranging from about 100 centipoise to about 10,000 centipoise, where viscosity is determined at a shear of 6.28 rad/sec using a TA instruments model DHR2 rheometer with two parallel 25 mm plates at a temperature of 100° C.; and
exposing the composite particles to a laser to fuse the particles.

2. The method of claim 1, wherein the at least one thermoplastic polymer is a latex.

3. The method of claim 1, wherein the at least one thermoplastic polymer is selected from the group consisting of polyacrylates, polybenzimidazoles, polycarbonates, polyether sulfones, polyaryl ether ketones, polyetherimide, polyethylenes, polyphenylene oxides, polypropylenes, polystyrenes, styrene-butyl acrylate, polyesters, polyurethanes, polyamides, Poly(vinylidene fluoride) (PVDF), polyvinyl chlorides and combinations thereof.

4. The method of claim 1, wherein the at least one thermoplastic polymer is selected from the group consisting of polyether ether ketone, polyethylene, poly(ethylene-co-vinylacetate), polypropylene, Poly(vinylidene fluoride-co-hexafluoropropylene), polystyrene, poly(styrene isoprene styrene), acrylonitrile butadiene styrene (ABS), poly(Styrene Ethylene Butylene Styrene) (SEBS), styrene n-butyl acrylate, polyethylene terephthalate, polylactic acid (PLA), polycaprolactone, poly (propoxylated bisphenol A co-fumarate), nylon and combinations thereof.

5. The method of claim 1, wherein the at least one carbon particle material is selected from the group consisting of carbon nanotubes, graphite, graphene and combinations thereof.

6. The method of claim 1, whereby the composite particles are formed by a process of emulsion aggregation, the process comprising:
providing a stable emulsion of latex polymer particles;
aggregating the latex polymer particles in the presence of the at least one carbon particle material to form aggregate particles comprising both the latex polymer particles and the carbon particle material; and
heating the aggregate particles to coalesce the latex polymer particles and form composite particles comprising the coalesced latex polymer and the carbon particle material.

7. The method of claim 1, wherein the carbon particle material is in an amount of at least 5% by weight, based on the total weight of the composite particles.

8. The method of claim 1, wherein the composite particles are toner.

9. A method of selective laser sintering, the method comprising:
providing composite particles made by emulsion aggregation, the composite particles comprising at least one thermoplastic polymer and at least one carbon particle material uniformly dispersed in the composite particle, the carbon particle material being in an amount of at least 5% by weight based on the total weight of the composite particles, the at least one carbon particle material selected from the group consisting of carbon nanotubes, graphite, graphene and combinations thereof, the at least one thermoplastic polymer having a low viscosity ranging from about 100 centipoise to about 10,000 centipoise, where viscosity is determined at a shear of 6.28 rad/sec using a TA instruments model DHR2 rheometer with two parallel 25 mm plates at a temperature of 100° C.; and
exposing the composite particles to a laser to fuse the particles to form a three-dimensional object by selective laser sintering.

10. The method of claim 9, wherein the at least one thermoplastic polymer is a latex.

11. The method of claim 9, wherein the at least one thermoplastic polymer is selected from the group consisting of polyacrylates, polybenzimidazoles, polycarbonates, polyether sulfones, polyaryl ether ketones, polyetherimide, polyethylenes, polyphenylene oxides, polypropylenes, polystyrenes, styrene-butyl acrylate, polyesters, polyurethanes, polyamides, Poly(vinylidene fluoride) (PVDF), polyvinyl chlorides and combinations thereof.

12. The method of claim 9, wherein the at least one thermoplastic polymer is selected from the group consisting of polyether ether ketone, polyethylene, poly(ethylene-co-vinylacetate), polypropylene, Poly(vinylidene fluoride-co-hexafluoropropylene), polystyrene, poly(styrene isoprene styrene), acrylonitrile butadiene styrene (ABS), poly(Styrene Ethylene Butylene Styrene) (SEBS), styrene n-butyl acrylate, polyethylene terephthalate, polylactic acid (PLA), polycaprolactone, poly (propoxylated bisphenol A co-fumarate), nylon and combinations thereof.

13. The method of claim 9, wherein the carbon particle material is in an amount of at least 5% by weight, based on the total weight of the composite particles.

14. A method of selective laser sintering, the method comprising:
making composite particles by an emulsion aggregation process, the composite particles comprising at least one thermoplastic polymer and at least one carbon particle material uniformly dispersed in the composite particle, the at least one thermoplastic polymer having a low viscosity ranging from about 100 centipoise to about 10,000 centipoise, where viscosity is determined at a shear of 6.28 rad/sec using a TA instruments model DHR2 rheometer with two parallel 25 mm plates at a temperature of 100° C.; and
exposing the composite particles to a laser to fuse the particles to form a three-dimensional object by selective laser sintering.

15. The method of claim 14, wherein the at least one thermoplastic polymer is a latex comprising at least one polymer selected from the group consisting of polyacrylates, polybenzimidazoles, polycarbonates, polyether sulfones, polyaryl ether ketones, polyetherimide, polyethylenes, polyphenylene oxides, polypropylenes, polystyrenes, styrene-butyl acrylate, polyesters, polyurethanes, polyamides, Poly (vinylidene fluoride) (PVDF), polyvinyl chlorides and combinations thereof.

16. The method of claim 14, wherein the at least one thermoplastic polymer is a latex comprising at least one polymer selected from the group consisting of polyether ether ketone, polyethylene, poly(ethylene-co-vinylacetate), polypropylene, Poly(vinylidene fluoride-co-hexafluoropropylene), polystyrene, poly(styrene isoprene styrene), acrylonitrile butadiene styrene (ABS), poly(Styrene Ethylene Butylene Styrene) (SEBS), styrene n-butyl acrylate, polyethylene terephthalate, polylactic acid (PLA), polycaprolactone, poly (propoxylated bisphenol A co-fumarate), nylon and combinations thereof.

17. The method of claim 14, wherein the at least one carbon particle material is selected from the group consisting of carbon nanotubes, graphite, graphene and combinations thereof.

18. The method of claim 14, whereby the process of emulsion aggregation comprises:
providing a stable emulsion of latex polymer particles;
aggregating the latex polymer particles in the presence of the at least one carbon particle material to form aggregate particles comprising both the latex polymer particles and the carbon particle material; and
heating the aggregate particles to coalesce the latex polymer particles and form composite particles comprising the coalesced latex polymer and the carbon particle material.

19. The method of claim 18, wherein providing the stable emulsion of latex polymer particles comprises:
providing at least one monomer material; and
preparing the stable emulsion of latex polymer particles from the monomer material.

20. The method of claim 14, wherein the carbon particle material is in an amount of at least 5% by weight, based on the total weight of the composite particles.

* * * * *